June 8, 1954
O. D. PREMO
2,680,321
DOUBLE HOOK FISH LURE
Original Filed June 6, 1947
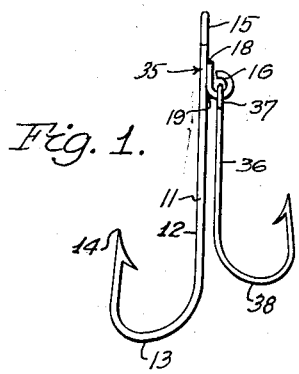
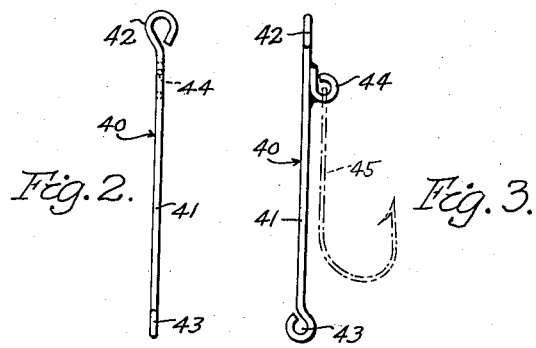
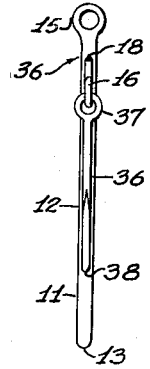
Inventor
Owen D. Premo
Barthel & Bugbee
Attorneys Patented June 8, 1954

2,680,321

UNITED STATES PATENT OFFICE 2,680,321

DOUBLE HOOK FISH LURE

Owen D. Premo, Muskegon Heights, Mich.

Original application June 6, 1947, Serial No. 753,110. Divided and this application October 4, 1949, Serial No. 119,486

1 Claim. (Cl. 43—44.82)

This invention relates to fishing tackle, and in particular to fish lures.

The object of this invention is to provide a fish lure consisting of a fish hook having a line attachment portion, such as an eye, at one end of its shank and also having an auxiliary eye secured to the shank adjacent the line attachment portion, and a second hook connected to the auxiliary eye.

This application is a division of my co-pending application Serial No. 753,110 filed June 6, 1947 for Fish Lure, now abandoned.

In the drawings:

Figure 1 is a side elevation of a fish lure according to one form of the invention wherein a single smaller hook is attached to an eye on the shank of a larger hook;

Figure 2 is a front elevation of a fish lure frame or support, according to a further modification of the invention, wherein various combinations of hooks or fish-attracting objects may be attached and interchanged;

Figure 3 is a side elevation of the fish lure frame shown in Figure 2 with an attached hook shown in dotted lines;

Figure 4 is a right-hand side elevation of a fish lure shown in Figure 1.

Referring to the drawings in detail, Figure 1 shows a fish lure, generally designated 35, according to one form of the invention as consisting of a large hook 11 having a shank 12 and a bight or hook portion 13 terminating in the usual barbed point 14. The shank 12 at its opposite end terminates in a main eye 15 to which the fishing line, leader, swivel or the like is attached, whichever is used. Also secured to the shank 12 adjacent the eye 15 is an auxiliary eye 16. The auxiliary eye 16 is mounted in the plane of the hook portion 13, shank 12 and point 14 of the main hook 11, but on the opposite side of the shank 12 from the point 14. The auxiliary eye 16 is secured in any suitable manner, such as by brazing, silver soldering or welding at the points 18 and 19. A smaller hook 36 has its eye 37 mounted upon the auxiliary eye 16 and has its bight or hook portion 38 facing in the opposite direction from the hook portion 13 of the main hook 11.

In the operation of the invention, the fishing line is attached to the eye 15, either with or without the swivel and leader. If desired, a live bait is threaded upon the hook portion 13 or 38 or both. The lure is then used in the usual way either in trolling or casting or in still fishing, with or without a float or bob. If the fish strikes at the bait on either of the hooks 11 or 36, it is impaled upon the barb of the hook portion 13 or 38 and is landed in the usual way. Thus, a fish striking at the lure of Figure 1 is able to take the entire lure in his mouth, including both of the hooks 11 and 36.

The modification, generally designated 40, shown in Figures 2 and 3, consists of a frame or lure support having a shank 41 with eyes 42 and 43 at its opposite ends and a third or auxiliary eye 44 secured, as by welding, adjacent the eye 42. This frame 40 enables the fisherman to make up his own combination lure, merely by attaching single, double, treble or gang hooks to the eye 43, and also to the eye 44, if he so desires. The line is attached to the eye 42, either with or without a swivel or leader. The attachment of the various hooks or fish attracting objects is made merely by spreading the gap in the eyes 43 or 44 by inserting a knife blade, the gap being afterward closed up with pliers. For purposes of illustration, a hook 45 is shown in chain lines (Figure 3) attached to the auxiliary eye 44.

The advantage of having the auxiliary hook 36 pivoted to the eye 16 is that this auxiliary hook 36 is movable with respect to the main hook 11 so that the hook 36 can be baited the full length of its shank and hook portion 38. Moreover, although the auxiliary hook 36 is movable, such motion is restricted by the eye 16 so that the auxiliary hook 36 can never interfere with the point 14 of the main hook 11. The reason for this restriction of motion is the fact that the eye 16 is attached to the shank 12 of the main hook and is in approximately the same plane as the shank 12 and barbed point 14 of the main hook but on the opposite side therefrom. Finally, since the eye 16 is separate from the line attachment eye 15 of the main hook, the auxiliary hook 36 may move more freely without obstruction from any other part of the fish lure and without obstructing the line or being obstructed by it.

What I claim is:

A fish lure comprising a main fish hook including an elongated shank having at one end a pointed bend projecting therefrom and at the other end a main eye for the attachment of a fish line, an auxiliary eye fixedly secured to said shank adjacent said main eye on the opposite side of said shank from said bend and disposed remote from said bend, an auxiliary fish hook having an eye thereon pivotally secured to said auxiliary eye, said auxiliary fish hook having a pointed bend projecting outwardly away from said shank in a direction opposite to the direction of projection of said main hook bend, the main eye being in a plane at a right angle to the plane of the auxiliary eye, said auxiliary eye being completely below the main eye and having a shank secured in parallel relation to the elongated shank, and said auxiliary hook having its bight normally located between the bight and eye of the main hook.

References Cited in the file of this patent

UNITED STATES PATENTS

| Number | Name | Date |
|---|---|---|
| 17,803 | McLean | July 14, 1857 |
| 440,721 | Provoost | Nov. 18, 1890 |
| 1,875,182 | Southwell | Aug. 30, 1932 |
| 1,995,985 | Jennings | Mar. 26, 1935 |
| 2,250,478 | Franks | July 29, 1941 |
| 2,272,332 | Sisson | Feb. 10, 1942 |

FOREIGN PATENTS

| Number | Country | Date |
|---|---|---|
| 889,397 | France | Oct. 4, 1943 |